United States Patent [19]

Linley, Jr.

[11] Patent Number: 4,593,572

[45] Date of Patent: Jun. 10, 1986

[54] LUBRICATED DRIVE MECHANISM

[75] Inventor: Francis M. Linley, Jr., Easton, Conn.

[73] Assignee: Universal Thread Grinding Company, Fairfield, Conn.

[21] Appl. No.: 538,324

[22] Filed: Oct. 3, 1983

[51] Int. Cl.$^4$ .................... F16H 27/02; F16H 1/18
[52] U.S. Cl. ............................ 74/89.15; 74/441; 74/467; 74/424.8 R
[58] Field of Search ............. 74/89.15, 441, 424.8 R, 74/467, 409

[56] References Cited

U.S. PATENT DOCUMENTS

| | | | |
|---|---|---|---|
| 2,338,271 | 1/1944 | Ulanet | 74/424.8 B |
| 2,403,092 | 7/1946 | Lear | 74/467 |
| 2,464,873 | 3/1949 | Lear | 74/424.8 R |
| 3,489,395 | 1/1970 | Glassmeyer | 74/461 |
| 3,831,460 | 8/1974 | Linley | 74/441 |
| 4,241,814 | 12/1980 | Masclet | 74/424.8 R |

FOREIGN PATENT DOCUMENTS

| | | | |
|---|---|---|---|
| 890440 | 2/1962 | United Kingdom | 74/89.15 |
| 900121 | 7/1962 | United Kingdom | 74/424.8 R |

*Primary Examiner*—Craig R. Feinberg

*Attorney, Agent, or Firm*—H. Gibner Lehmann; K. Gibner Lehmann

[57] ABSTRACT

A sealed, precision screw feed device for equipment of the type having a stationary base and a reciprocating carriage member. The device has an elongate tubular housing carrying a shaft with a precision thread, one end of the shaft projecting from one end of the housing and being adapted for connection to a suitable drive motor carried on the base. A nut is disposed completely within the housing, carried by the shaft and connected with a hollow thrust rod that projects from the opposite end of the housing. The housing contains a quantity of lubricant; shaft seals at its opposite ends prevent the lubricant from leaking out past the threaded shaft and thrust rod. The exposed end of the thrust rod has a universal joint which is connected to the carriage member. Also, the bore of the thrust rod is sealed off, to prevent lubricant from escaping through this avenue. The disclosed arrangements provide precision movement of the carriage member, even over extended periods of use. The operation is characterized by minimal wear of the various parts, and significantly reduced operating temperatures, especially at the more frequent points of contact of the nut and shaft. Lubricant can be temperature-controlled at an external point and pumped through the housing to further minimize wear.

19 Claims, 24 Drawing Figures

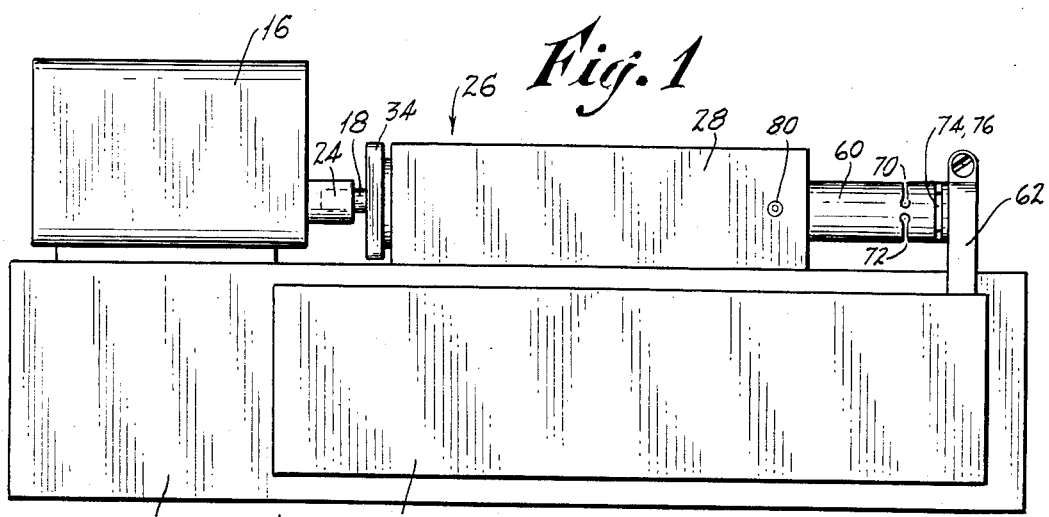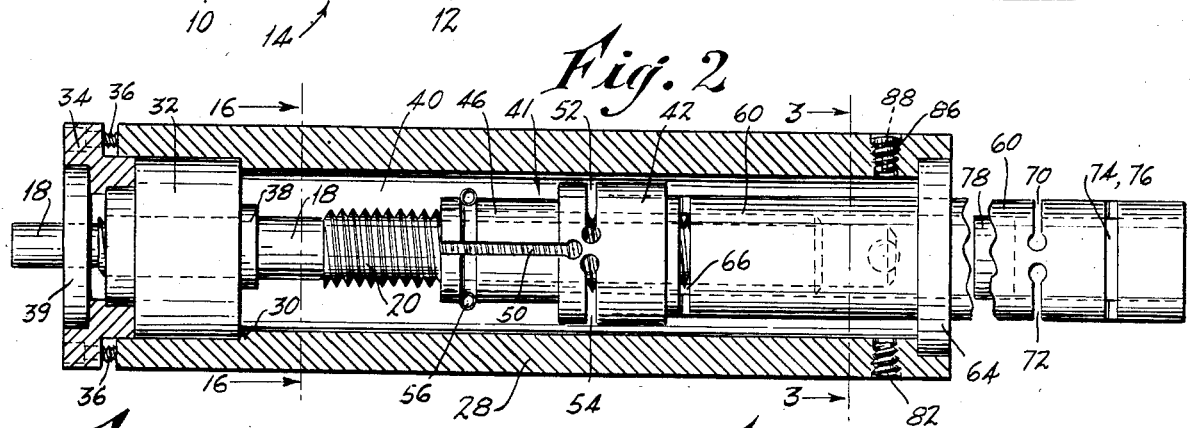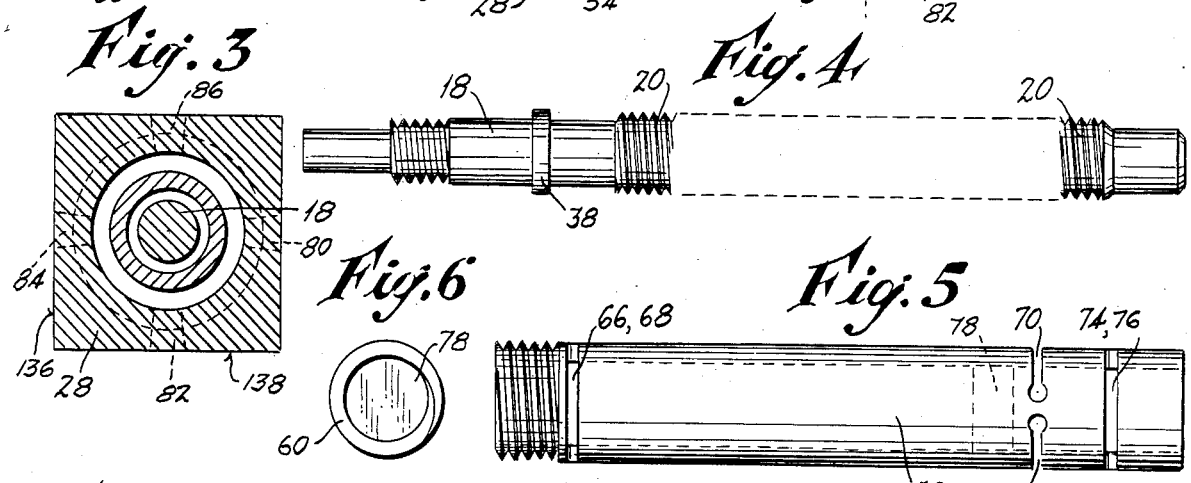

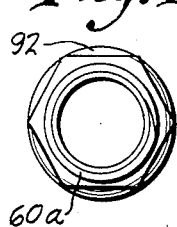
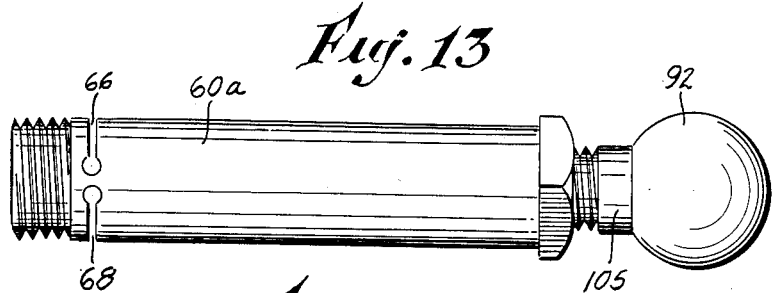
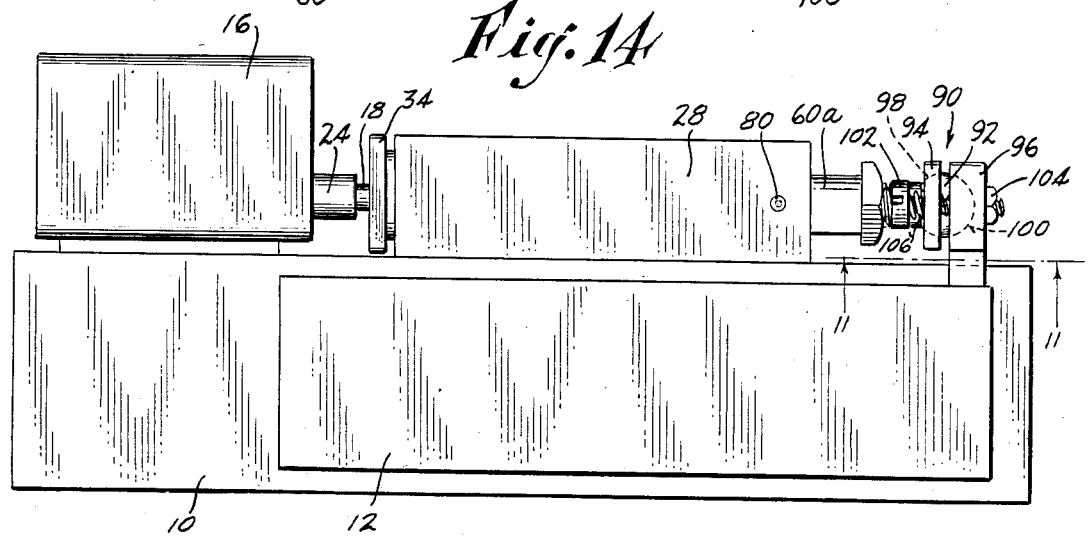
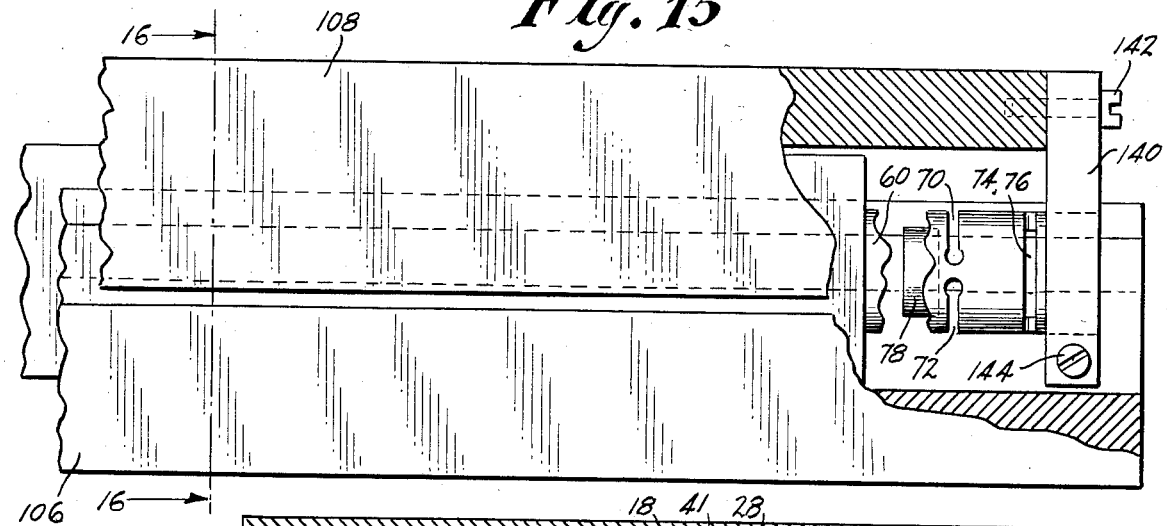
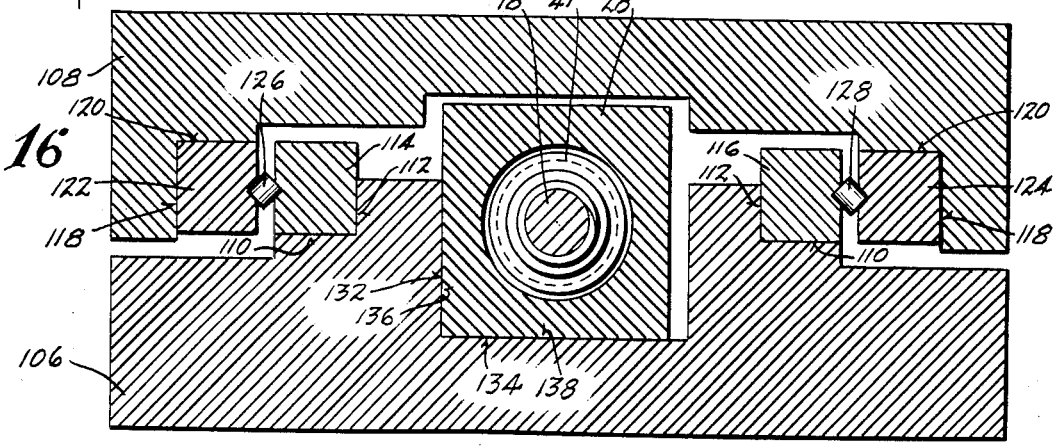

LUBRICATED DRIVE MECHANISM

CROSS REFERENCES TO RELATED APPLICATIONS

Copending U.S. application, Ser. No. 256,500, filed Apr. 22, 1981, now U.S. Pat. No. 4,434,677, in the name of Francis M. Linley, Jr., entitled ANTI-BACKLASH SPRING-MOUNTED NUT.

BACKGROUND

This invention relates generally to high accuracy, low-friction reciprocating drive mechanisms, and more particularly to improvements in the constructions illustrated and described in U. S. Pat. No. 3,831,460 dated Aug. 27, 1974, entitled ANTI-BACKLASH NUT, and U.S. Pat. No. 3,977,269 dated Aug. 31, 1976, entitled ANTI-BACKLASH, SELF-ALIGNING NUT. The improvements of the present invention can be embodied in the construction disclosed and claimed in the copending application identified above.

U.S. Pat. No. 3,831,460 involves an anti-backlash nut construction incorporating a nut body which is split longitudinally along an axial plane, and which has a single pair of transverse slots adjacent the ends of the longitudinal slots, such that limited radially inward movement of the nut halves can occur under the biasing action of a garter (coil) spring seated in an external annular groove at the end of the nut body. The inner surfaces of the nut halves are threaded, and the threads of the nut closely follow the threads of the screw shaft to the end that there is no looseness between the two parts, resulting in virtually zero backlash.

The above arrangement has been found to operate exceptionally well; only after very prolonged use was there a tendency for wear to occur at the points of contact of the threads. Even though bronze nuts and steel screws were used, and with lubricant applied to the threads, eventually the oil film dissipated, resulting in somewhat increased drag forces, reduced efficiency, and possible sacrifices in tracking accuracy. Also, due to the friction between the nut and screw, heat could be generated, especially at higher operating speeds. If temperatures increased substantially, the lubricant could thin out, which might further aggravate any tendency for heat build-up.

In the patented constructions the nut parts were spring biased into relatively firm engagement with the threads of the screw, which could give rise to appreciable drag between the parts. For some applications, such drag might be considered objectionable. Even where such forces could be tolerated, they could contribute significantly to the wear experienced by the engaging surfaces, especially after a very extended operation.

If the threads of the screw were exposed, dirt or debris could become lodged in the grooves, especially if the device was operated in an adverse or unfavorable environment.

In the other prior arrangements of which I am aware, there were almost always experienced similar problems involving dirt and contamination, excessive heat or drag forces, and consequent wear.

SUMMARY

The above disadvantages and drawbacks of prior anti-backlash drive devices are largely obviated by the present invention, which has for one object the provision of a novel and improved precision screw drive construction which is extremely simple in its structure, while at the same time providing improved performance and increased reliability over extended periods of use.

A related object of the invention is to provide an improved precision screw drive device as above set forth, wherein there is significantly minimized the wear of the various parts, thus virtually eliminating the need for servicing and/or replacement of components.

Still another object of the invention is to provide an improved precision screw drive device as above characterized, wherein the drag force experienced by the drive screw is significantly reduced, thus making the device adaptable to applications where excessive drag would be considered objectionable.

Yet another object of the invention is to provide an improved precision drive construction of the kind indicated, characterized by significant reduction in heat generated by friction at the points of contact of the nut and screw, along with improved dissipation of such heat through the use of continuous hydrodynamic lubrication and heat-conductive housing materials.

A further object of the invention is to provide an improved precision drive construction as outlined above, wherein the engaging surfaces of the screw and nut are confined in a sealed housing, thereby minimizing the possibility of dirt or other debris lodging between the threads and causing premature wear or erratic operation.

A still further object of the invention is to provide an improved precision drive construction in accordance with the above, wherein the engaging surfaces of the screw and nut are continuously bathed in lubricant, and wherein the drag force on the screw does not materially increase with increasing r.p.m.

The above objects are accomplished by the provision of a sealed, precision screw feed device comprising an elongate tubular housing in which there is disposed a shaft having a precision thread, a nut carried on the shaft and engaging the thread thereof, a hollow thrust rod attached to the nut, and shaft seals disposed at both ends of the housing. The housing has a precise bearing bore for holding a bearing for the shaft, and is at least partially filled with lubricant, and the shaft seals prevent loss of the same. The shaft has a drive portion which projects from one end of the housing, and is intended to be rotated by a drive motor that in turn effects axial movement of the nut and thrust rod. One end of the thrust rod projects from the opposite end of the housing and has a universal joint for connection with a reciprocatable member or carriage of a piece of equipment.

The arrangement is such that the engaging surfaces of the nut and screw thread are continuously bathed in the lubricant, making for an exceptionally low-friction, low wear drive. The lubricant effectively channels heat away from the points of contact of the nut and screw, and conducts the heat to the housing, where it is dissipated by both conduction and radiation. Reduced operating temperature is thus realizeable. Also, the universal joint at the end of the thrust rod minimizes the effect of any slight misalignments between the rod and carriage, thus circumventing problems with binding or seizing of parts, etc.

The objects are further accomplished by the addition of a lubricant reservoir which communicates with a vent aperture in the top wall of the housing. As the nut is reciprocated in the housing, lubricant can flow from the reservoir, as by gravity, into the housing during movement of the nut in one direction, and can be forced backward and upwardly through the vent and into the reservoir when the nut is moved in the other direction. The arrangement is such that ample lubricant is available at all times. Also pressure changes within the chamber formed by the sealed housing, resulting from movements of the nut and thrust rod, are relieved through the reservoir, as required. The vent in the housing thus acts as a bleed opening for this chamber, and the reservoir stores any lubricant which has been bled through the vent, and makes it available for re-introduction into the chamber when its volume is increased. The nut acts, in effect, like a piston loosely related to the housing bore. The housing in the illustrated embodiment of the invention has at least two, expansive exterior wall surfaces in parallelism with its bearing bore, to insure quick, accurate installation on the related equipment. One end seal is disposed closely adjacent a combined radial-thrust bearing for the shaft carried in the housing bearing bore whereby it is safeguarded against lateral forces tending to disrupt the seal. The universal joint at the nut comprises slots which provide added access for lubricant to the precision screw, insuring adequate lubrication of the same at all times.

The objects are further accomplished in the overall combination of a traverse mechanism comprising a base, a carriage carried by and movable with respect to the base, powered means, a bearing providing a slide between the carriage and base, and a sealed, lubricated drive train interposed between the carriage and the powered means. The drive train includes a precision screw shaft and a precision nut carried thereby, and also a tubular lubricant-containing housing that encircles at least a portion of the shaft. The threaded portion of the shaft is disposed completely within the housing, as is the nut which is engaged by the shaft. A thrust rod connected to the nut forms therewith a universal joint. The exterior end of the thrust rod connects with the carriage to move essentially in unison therewith as the precision nut traverses the threaded portion of the screw shaft.

The objects are further accomplished by the above overall combination of traverse mechanism and drive train, wherein the housing is constituted of metal having good heat-conductive characteristics, and constitutes a chamber in which the shaft and nut are continuously bathed in lubricant. The lubricant transfers heat generated between the screw shaft and nut to the housing which in turn transfers heat to the base of the equipment traverse mechanism so as to minimize any tendency for such heat to build up at the points of contact of the nut and shaft.

The disclosed embodiments of the invention have the following advantages over the devices of the prior art. There is a substantial reduction in operating temperature between the precision nut and screw shaft by virtue of the hydrodynamic lubrication which is provided in the tubular housing. The reduction results not only from the reduced friction between the screw shaft and nut, but also from the heat-sink effect of the lubricant, which picks up heat from the nut and screw and transfers it to the housing. Where the latter is constituted of aluminum, this heat is quickly absorbed, and in turn transferred to the structure to which the housing is attached, i. e. a base member of a slide mechanism. It has been found that very good heat transfer occurs, with temperature rises typically on the order of 10 degrees F. or less at screw speeds of 1000 rpm or less. The dissipation of heat is especially important in applications involving precision nut constructions of the type disclosed, where halves of the nut are biased toward one another by a spring and snugly engage the threads of the screw. By providing the hydrodynamic lubrication, increased spring pressure on these nut halves can be tolerated, which increases the potential load capacity of the drive, as well as insuring precision tracking of the nut on the screw thread.

In addition to the increased load handling capacity of the nut, the stiffness of the hinges which form the universal joints can be increased accordingly, to provide improved tracking at high loads.

In the disclosed embodiments, the alignment of the various components of the slide with the nut and screw is insured automatically by virtue of performing certain normally required machining operations on the parts. Accordingly, errors in assembly due to operator judgement are virtually completely eliminated, and such assembly can be readily accomplished by relatively unskilled personnel. The overall manufacturing cost is thus kept as low as possible while maintaining the required precision.

Other features and advantages will hereinafter appear.

In the drawings, illustrating several embodiments of the invention:

FIG. 1 is a top, plan view of a powered apparatus having a reciprocatable table or carriage driven by the improved fluid-sealed lubricated reciprocating drive as provided by the invention.

FIG. 2 is an axial sectional view of the fluid-sealed reciprocating drive illustrated in FIG. 1.

FIG. 3 is a transverse section taken on the line 3—3 of FIG. 2.

FIG. 4 is a side or plan view of the precision screw of the reciprocating drive.

FIG. 5 is a side elevation of the thrust rod or shaft of the reciprocating drive, in which the screw of FIG. 4 telescopes.

FIG. 6 is an end elevational view of the thrust rod or shaft of FIG. 5.

FIG. 7 is a side elevational view of the anti-backlash nut of the reciprocating drive, which is threaded on the precision screw shaft of FIG. 4.

FIG. 8 is a left end elevational view of the anti-backlash nut of FIG. 7.

FIG. 9 is a transverse section of the anti-backlash nut, taken on the line 9—9 of FIG. 7.

FIG. 10 is a right end elevational view of the anti-backlash nut.

FIG. 11 is a detail of a modification of the invention, showing a ball-joint type of aligning or universal-movement connection for use at the exterior of the reciprocating drive, in place of pairs of hinge slots.

FIG. 12 is an end elevational view of the modified thrust shaft having the ball joint shown in FIG. 11.

FIG. 13 is a side elevational view of the modified thrust rod or shaft of FIGS. 11 and 12.

FIG. 14 is a top plan view of an apparatus comprising a reciprocatable table or carriage of the type shown in FIG. 1, but embodying the modified thrust rod or shaft of FIGS. 11-13. The view of FIG. 11 is a section taken on the line 11—11 of FIG. 14, on a different scale.

FIG. 15 is a fragmentary view partly in side elevation and partly in vertical section, of another type of apparatus having the improved reciprocating drive of the invention.

FIG. 16 is a transverse section, taken on the line 16—16 of FIG. 15. Also, a similar section of the reciprocating drive per se is indicated by the line 16—16 in FIG. 2.

FIG. 24 is a diagrammatic representation of another embodiment of the invention, wherein external cooling of the lubricant is provided for.

Figure 17:
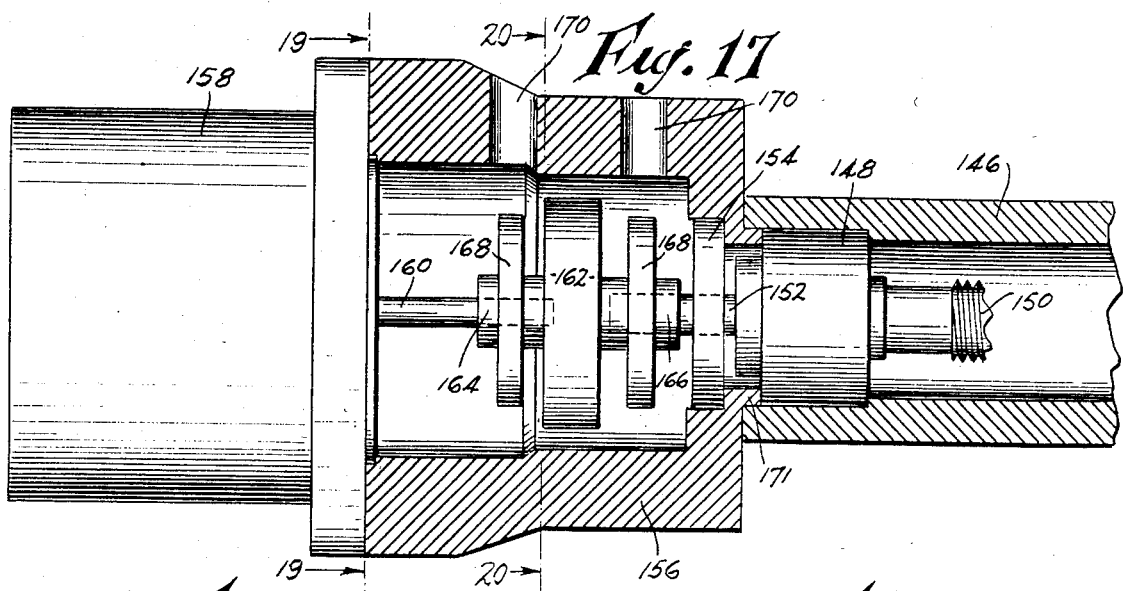
FIG. 17 is an axial sectional view of a coupling for connecting the improved reciprocating drive of the invention with a drive motor.
Figure 18:
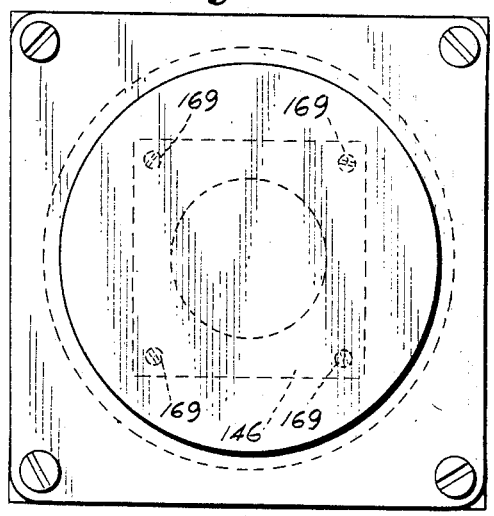
FIG. 18 is a left end elevational view of the coupling assemblage of FIG. 17.
Figure 19:
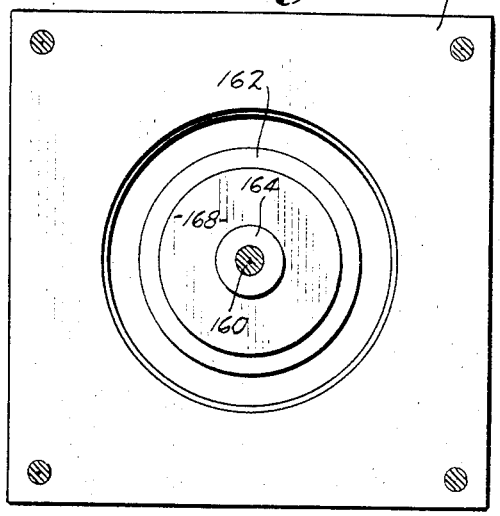
FIG. 19 is a transverse section, taken on the line 19—19 of FIG. 17.
Figure 20:
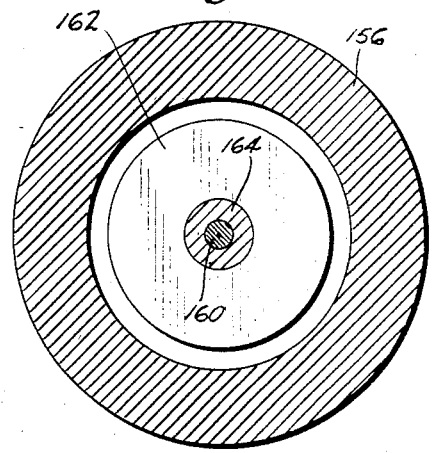
FIG. 20 is a transverse section, taken on the line 20—20 of FIG. 17.

Referring first to the embodiment shown in FIGS. 1–10, there is illustrated equipment of the type having a stationary base 10 and a reciprocating carriage 12, equipped with the present improved precision reciprocating screw feed drive therefor, the apparatus being generally designated by the numeral 14 in FIG. 1. Such equipment is frequently known by the term traverse mechanism. The carriage 12 is supported for sliding movement over the base 10, by a suitable bearing (not shown in this embodiment). Mounted on the base 10 is a powered drive means in the form of an electric motor 16 which is arranged to turn a shaft 18 having a precision ground thread 20. The shaft 18 is particularly illustrated in FIG. 4, and has a drive portion or end which extends to a coupling 24 on the motor output shaft.

In accordance with the present invention there is provided a novel lubricated screw feed device or drive train 26 which precisely converts the rotary motion of the motor shaft coupling 24 to linear motion, and transmits this to the carriage 12 with a high degree of efficiency and with virtually zero backlash. The screw feed device 26 is particularly illustrated in FIG. 2, and comprises a tubular housing 28 having an internal annular shoulder 30 at one end, against which there is held a combined radial-thrust bearing 32. The bearing is secured in position by an end cap 34 which in turn is held by multiple screws 36. The shaft 18 has a shoulder 38 which can bear against the inner race of the bearing 32, as shown in FIG. 2. The end cap 34 has a circular recess 55 in which there is disposed a shaft seal 39 that may be of conventional construction.

The housing 28 is preferably of rectangular or parallele-piped exterior configuration with at least two precise planar faces, and has a through bore 40 the shouldered bearing portion (that part including the shoulder 30 carrying the bearing 32) of which is precisely accurately disposed with respect to said two faces, in the context of parallelism.

Cooperable with the shaft 18 is an anti-backlash nut 41 particularly illustrated in FIGS. 7–10, comprising a body 42 with a threaded bore 44, and a smaller-diameter thread-engaging portion 46 which is slotted, the longitudinal slots thereof being designated 48, 50. The body portion 42 has transverse hinge-providing slots indicated at 52, 54. The slots 48, 50 separate the portion 46 into two halves which can move in radially inward directions toward one another under the action of a garter spring 56, FIG. 2, that is seated in an external annular groove 58 in the halves. The inner surfaces of the nut halves of the portion 46 are threaded; with the spring 56 applied in the manner of FIG. 2, these halves snugly engage the external thread 20 of the screw shaft 18 so as to essentially completely eliminate all looseness between the nut and screw.

Referring again to FIG. 2 and by the present invention, the anti-backlash nut 41 is seen to be disposed completely within the housing 28, as is the threaded portion 20 of the shaft 18. The body 42 of the nut has a loose relationship with the bore 40 of the housing 28, in the nature of a loose piston therein; it telescopically receives and carries an elongate, hollow thrust rod 60 which is particularly illustrated in FIGS. 5 and 6. The rod 60 is threaded at one end, and is screwed into corresponding threads in the bore 44 of the nut body 42. The end of the rod 60 projects from the opposite end of the housing 28, as in FIGS. 1 and 2, and is secured to a clamping member 62 on the carriage 12. This end of the housing 28 has an additional seal 64 which may be somewhat similar in construction to that of the seal 39. A seal of the type manufactured by Garlock, Inc. of Palmyra, N.Y., known by the name "Klozure (a registered trademark) Oil Seal" model No. 63 211580139, has been found to provide satisfactory results in the present installation, as the seal 64.

The thrust rod 60 has two oppositely disposed aligned transverse slots 66, 68 which are phase displaced by 90 degrees with respect to the pair of aligned slots 52, 54 of the nut body. These four slots constitute a universal joint which permits small misalignments to occur between the screw shaft 18 and the thrust rod 60, without causing binding or jamming of the parts. In addition, disposed at the opposite or external end of the thrust rod 60 is an additional universal joint formed by two oppositely-disposed aligned transverse slots 70, 72 and two additional oppositely-disposed aligned transverse slots 74, 76 phase displaced by 90 degrees from the first pair. These latter four slots are disposed adjacent to the point of connection of the body portion of the thrust rod 60 and clamping member 62.

With the above arrangement there is had a substantially completely sealed chamber 40 within the housing 28, since the ends of the latter have been closed off by the shaft 18 and its seal 39 at one end, and by the rod 60 and its seal 64 at the other end. By the present invention, the chamber 40 of the sealed housing 28 is partially or fully filled with a quantity of lubricant, such that the surfaces of engagement of the screw shaft 18 and nut 41 are continuously bathed in the lubricating substance. It will be seen that the rod 60 is hollow, so as to receive the end of the screw 18 when the nut reciprocates, as can be understood. In order to prevent loss of lubricant through the hollow of the rod 60, a small plug 78 is provided, FIG. 2, which constitutes a transverse interior wall for the rod. This can be merely pressed and cemented in place during assembly of the drive mechanism.

Also in accordance with the present invention, the tubular housing 28 is provided with one or more plugs or fittings in its walls, indicated in dotted outline in FIG. 3 by the numerals 80, 82, 84 and 86. Any one of the plugs can be removed, in order to fill in or drain lubricant from the housing interior. The uppermost fitting 86 has a vent opening 88 which provides relief for pressure variations resulting from changes in the volume of the chamber 40 formed by the housing as the nut 41, acting somewhat as a piston, reciprocates.

Referring to FIGS. 1 and 2, the operation of the drive mechanism can now be readily understood, FIG. 1 being a top plan view of the equipment. The carriage 12 is supported for reciprocative movement along the base 10 by suitable bearings and guides or tracks, the nature of which will be disclosed below in connection with alternate embodiments of the invention. The motor 16 and housing 28 are stationary with respect to the base 10. Operation of the motor will cause turning of the screw shaft 18, which will in turn drive the nut 41 and thrust rod 60 either to the left or right as viewed in FIG. 2. Central portions of the thrust rod 60 are connected through the universal joint formed by the slots 70, 72 and 74, 76 to the clamping member 62 which in turn is mounted on the carriage 12. The anti-backlash nut 41 and carriage 12 thus reciprocate in unison with one another, as the nut 41 traverses the threaded portion 20 of the screw shaft.

Any slight misalignments have minimal effect on the operation, and no binding or seizing of parts occurs. In particular, misalignment between the threaded portion 20 of the screw shaft 18 is taken up by the universal joint comprising the slots 52, 54 and 66, 68. Similarly, the slots 70, 72 and 74, 76 correct for slight misalignment between the thrust rod 60 and the clamping member 62, as dictated by the mounting arrangement or tracks (not shown) which are provided for guiding the carriage 12. Excellent tracking of the carriage along the base is thus realizeable.

Another embodiment of the invention is illustrated in FIGS. 11-14, wherein like reference numerals designate parts similar to those of the first embodiment. This construction comprises the base 10 over which the carriage 12 moves, the electric motor 16 having the output coupling 24, the screw shaft 18 having its input drive portion connected to the coupling 24, and the sealed tubular housing 28 with end cap 34. Disposed in the housing 28 is the anti-backlash nut 41 similar to that illustrated in FIGS. 2 and 7-10, to which there is attached a thrust rod 60a. Adjacent its point of attachment to the anti-backlash nut, the rod 60a has oppositely disposed transverse slots similar to those indicated at 66, 68 in the previous construction.

In accordance with the invention, there is provided a modified universal joint 90 particularly illustrated in FIG. 11, comprising a ball 92 and socket members 94, 96 having seats 98, 100 of generally spherical configuration in which the ball 92 is held captive. The sockets are in the form of parallel clamp plates which are held by screws 102 and nuts 104. Springs 106' may optionally be placed under the screw heads or under the nuts in order to apply pressure to the plates, thus minimizing looseness between them and the ball 92. As shown in FIG. 14, the plate 96 is attached to the carriage 12.

The thrust rod 60a is threaded at one end, as in FIG. 13, this end being screwed into the bore 44 of the nut body 42 as in the previous embodiment. Slots are provided adjacent this end, indicated at 66 and 68, which, together with the slots 52, 54 of FIG. 2, provide a universal joint on opposite sides of the point of connection of the nut 41 and thrust rod 60a. The slots 52, 54 of the nut 41 are phase displaced by 90 degrees from the slots 66, 68 in order to provide the desired universal joint action.

In other respects, the embodiment of FIGS. 11-14 is similar to that of the previous construction, and accordingly further discussion of the details is omitted.

FIGS. 15 and 16 illustrate yet another embodiment of the invention involving the application of the drive mechanism of FIG. 2 to a piece of equipment having a stationary base 106 and a carriage 108 movable thereon. As shown in FIG. 16, the carriage 108 and base 106 have cooperable track means in the form of precision track-like bearings. In forming such bearings, the base 106 has shoulders 110, 112 which carry accurately-machined steel guide rails 114, 116 respectively. The carriage 108 has similar, precision shoulders 118, 120 to which there are secured precise steel guide rails 122, 124 respectively. Disposed between the rails 114 and 122, and rails 116, 124 are obliquely disposed precision rollers 126 and 128, respectively which enable the carriage 108 to slide over the base 106 along an accurate track when powered by the drive mechanism.

FIG. 16 illustrates, in cross section, the drive mechanism of FIG. 2, including the housing 28, screw shaft 18, and anti-backlash nut 41. By the present invention, the base 106 has a milled straight-sided and straight-bottomed groove with two mounting surfaces or faces 132, 134 which are of considerable or significant expanse and longitudinal dimension or extent, and which intersect one another at a predetermined angle, preferably 90 degrees. In addition, the housing 28 has two cooperable precise intersecting mounting surfaces or faces 136, 138 which are of appreciable longitudinal expanse, and which engage the faces 132, 134 respectively so as to be in good, heat-exchanging physical contact therewith but also to effect accurate alignment of the screw 18 with respect to the tracking of the carriage 108. The mounting surfaces 136, 138 are parallel to the axis of the shoulder 30 and bearing part of the housing bore 40, whereby the bearing 32 is precisely positioned with its axis parallel to the mounting faces 136, 138 of the housing 28. The housing 28 is secured to the base 106 by suitable screws (not shown). FIG. 15 shows the equipment, partly in elevation and partly in section. The carriage 108 is joined to the end of the thrust rod 60 by a clamping member 140, with screws 142, 144. At the end of the rod is a universal joint, formed by the slots 70, 72 and 74, 76. A suitable powered means similar to the motor 16 can be provided (not illustrated in FIGS. 15 and 16), for turning the screw shaft 18. The exact configuration of the motor could be somewhat different from that shown in FIG. 1, in order to suit space requirements of the particular construction shown in FIGS. 15 and 16.

The arrangement disclosed in FIGS. 15 and 16 has the following important advantages. Heat which is generated between the screw shaft 18 and nut 41 is transferred to the lubricant (not shown in FIG. 16) which in turn conducts it to the housing 28. This housing is preferably constituted of aluminum which is a good heat conductor. Since there are expansive faces 132, 134 and 136, 138 in contact with one another, much of this heat is conducted to the base 106, which is of sufficient mass to effectively draw the heat away. As a result, operating temperatures of the screw-nut assembly are kept low, preventing deterioration of the parts, as well as minimizing distortion resulting from expansion and contraction. By the provision of such hydrodynamic lubrication, greatly reduced wear is also realizeable, and smoother, more reliable operation results. Efficiencies on the order of 80% or more can be achieved, whereas in many prior arrangements, the efficiency was much lower, on the order of 20%–30%, for example. Also, by minimizing the heat build up, adverse effects on the lubricant are avoided. That is, the lubricant does not tend to thin out as much with a relatively small temperature rise as would be the case were higher temperature operation to be encountered. Moreover, torque on the screw does not increase materially with increasing r.p.m., as was the case in many previous constructions.

By milling the faces 110, 112, 132 and 134 of the base in the same set-up, precise alignment of all four planar surfaces can be achieved. Thus, when the precision housing 28 is installed flat against the walls of the milled groove (faces 136, 138), a perfect alignment of the bore of the housing 28 with the rails 114, 116 occurs. Such precise alignment eliminates problems which would otherwise occur, and which might tend to defeat smooth operation during the reciprocation of the carriage 108 over the base 106. Moreover, the assembly of the housing 28 onto the base 106 requires no operator judgement, and accordingly the operation can be handled by relatively unskilled personnel. This is considered to be an important feature of the invention.

Another embodiment of the invention is illustrated in FIGS. 17–20, showing a coupling arrangement between an electric motor and a drive screw mechanism somewhat different from that shown in FIGS. 1 and 2. In FIG. 17, the housing 146 carries a bearing 148. The screw shaft is indicated 150, and has a projecting end or drive portion 152. A seal 154 is mounted in one end of an annular coupling casing or adapter housing 156. The motor 158 is secured to the housing 156 with screws, as in FIG. 18, and has an output shaft 160. A coupling member 162 is provided, comprising collars or bushings 164 and 166, and two clamps 168. Access holes 170 in the casing 156 enable the clamps 168 to be tightened on the bushings 164 and 166. The casing 156 has an annular flange 171 which is received in the bore of the housing 146, as shown, and can be secured by screws 169, as shown dotted in FIG. 18. The arrangement disclosed in FIGS. 17–20 can be substituted for the constructions of the previous mechanisms if dictated by space requirements. With such a motor coupling, problems of misalignment between the motor output shaft 160 and the screw shaft 150 are largely eliminated. In other respects, the operation of this embodiment is similar to that of the prior arrangements.

Figure 21:
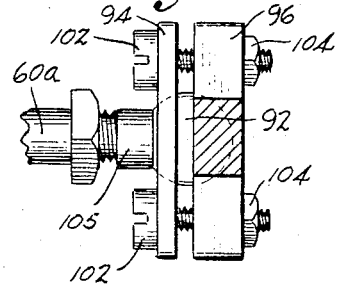
FIG. 21 is a detail showing a ball type swivel joint similar to that of FIG. 11 but with springs omitted.
Figure 22:
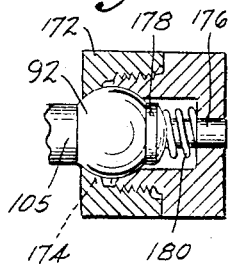
FIG. 22 is a fragmentary section of a swivel-type ball joint, showing a modified spring construction applying bias to the ball element.

FIGS. 21 and 22 illustrate alternate constructions of the universal joint which is employed to connect the extremity of the thrust rod 60 to the carriage 12 of the equipment. The arrangement of FIG. 21 is similar to that of FIG. 11, with the exception that the springs which were employed in FIG. 11 have been omitted. In particular, the thrust rod 60a carries a stud 105 having the ball 92, and two clamping plates 94, 96 having spherical seats which bear against the ball, with the plates being held by screws 102 and nuts 104. The plate 96 is connected to the carriage 12 as before.

FIG. 22 illustrates a further modification of a universal joint, which can be substituted for those of FIGS. 1, 11 or 21. The stud 105 carries the ball 92. A socket 172 provides a seat 174 for the ball, and a plunger 176 having a cup or end fitting 178 is biased into engagement with the ball 92 by a spring 180. Virtually all looseness between the socket 172 and seat 174 is eliminated.

Figure 23:
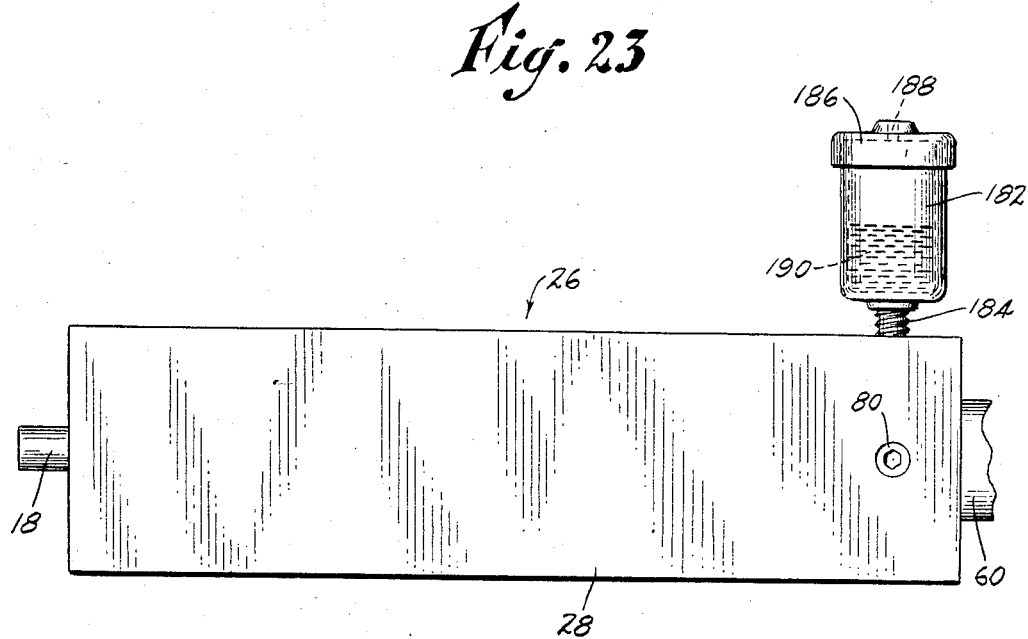
FIG. 23 is a side elevation of a modified screw feed mechanism, employing a lubricant reservoir which is mounted on the top wall of the housing.

Yet another embodiment of the invention is shown in FIG. 23, wherein there is provided the drive feed mechanism 26 of substantially the same construction as that illustrated in FIGS. 1 and 2. The mechanism comprises the housing 28, screw shaft 18 and thrust rod 60. The near side wall of the housing 28 has the plug 80. By the present invention, there is carried at the top of the housing 28 a lubricant reservoir 182. The interior of this reservoir communicates with the interior 40 of the housing 28 through a suitable threaded nipple 184 having a venting aperture. The reservoir has a lid 186 with a small vent hole 188, and is filled partially with a quantity of lubricant 190, indicated by the dotted lines. As the anti-backlash nut (41 in FIG. 2) reciprocates in the manner of a loose piston, the volume of the chamber 40 formed by the housing 28 changes, creating either a positive or negative pressure therein. Lubricant is thus caused to flow from the reservoir 182 into the housing interior as the chamber volume increases, and to be forced back up into the reservoir as the chamber volume decreases. The vent 188 provides relief for pressure which would otherwise build up within the reservoir as the level of lubricant rises or falls, as can be readily understood.

Figure 24:
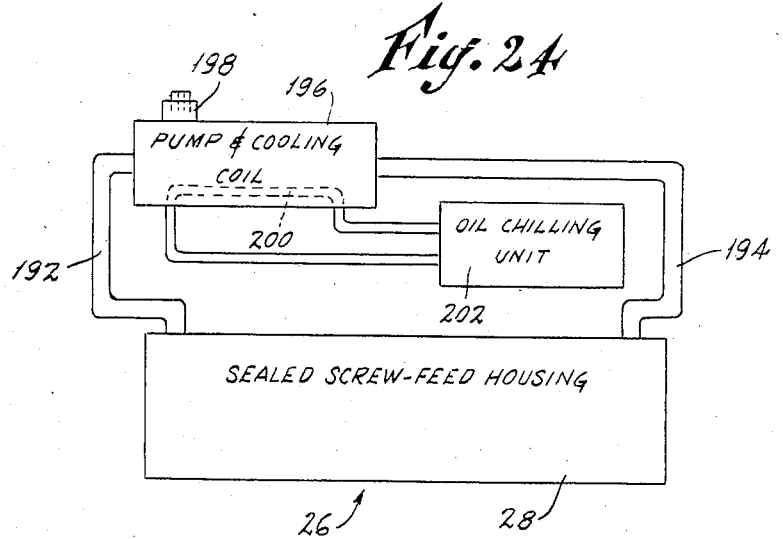

Still another embodiment of the invention is shown in FIG. 24, wherein the housing 28 has oil or lubricant lines 192, 194 connected to a circulating pump and cooling coil unit 196 which is vented at 198. The unit 196 has lubricant cooling coils 200 connected to a temperature-controlled oil chilling unit 202. With this arrangement the temperature of the lubricant in the housing can be closely controlled and held to a desirable value, if critical requirements of precision and extended life cycle are important.

From the above it can be seen that I have provided novel and improved precision screw feed devices which are especially simple in construction and which provide significantly improved efficiency and greatly increased resistance to undesired wear over extended periods of use. The lubricant functions both to reduce friction between the moving parts, and to dissipate heat away from the screw and nut, and thereafter enable it to be radiated from larger expansive areas of the equipment. The operating temperatures of the device are substantially reduced over those which would occur in the absence of dynamic lubrication in a sealed, heat-conductive, tubular housing. Also, better temperature uniformity results. The enforced movement of the lubricant in the chamber 40 causes it to flow into the slots 52, 54, 66 and 68 and to intimately, continuously engage the precision threads 20 of the screw 18, especially by the piston effect of the nut 41 in the chamber 40. Thus, improved thread lubrication and increased life is had, and there is little tendency for the lubricant to lose viscosity as a result of its temperature being raised. The sealed nature of the housing prevents dirt or debris from lodging in the thread grooves, and causing excessive wear or erratic operation. The hydrodynamic lubrication effects high efficiency, and the oil film causes leadscrew wear to be almost non-existent, increasing life considerably. At no table load, the nut above static levels shows no torque increase, up to 1500 RPM. The greater hinge thickness reduces axial deflections, and the oil body prevents hot spots along the screw, such as might occur from concentrated usage of one particular area thereof. Heat compensation can be utilized where highest accuracy is wanted.

The device thus represents a distinct advance and improvement in this field.

Variations and modifications are possible without departing from the spirit of the invention.

What is claimed is:

1. A sealed screw feed device comprising, in combination:
   (a) an elongate tubular housing having an interior containing a continuous uniform diametered bore and openings at both its ends communicating with said bore,
   (b) a bearing for a shaft, disposed in the housing adjacent one of its ends,
   (c) a shaft having precision threads, said shaft being disposed within said housing and having a drive portion journaled in said bearing and projecting from said one end of the housing, and said drive portion being provided with means for engagement by a drive device to effect its turning,
   (d) a nut carried in the housing by said shaft and engaging the precision threads, said nut undergoing axial movement with respect to the housing and shaft as the shaft turns,
   (e) a hollow thrust rod at one end attached to said nut, said thrust rod projecting from the other end of said housing and receiving portions of said shaft,
   (f) seals disposed in the ends of the housing, engaging the drive portion of said shaft and the hollow thrust rod respectively, to seal the interior of the housing against loss of lubricant,
   (g) said thrust rod having a transverse interior wall intermediate its ends to prevent the passage of lubricant through it from the housing,
   (h) universal hinge means carried by an exterior portion of the thrust rod, and
   (i) means connected with said universal hinge means, for attaching the same to a reciprocatable member of a peice of equipment for effecting reciprocation of the member as the shaft is turned first in one direction and then in an opposite direction,
   (j) all portions of said nut and all portions of the thurst rod that project into the housing being smaller than the housing bore to provide clearance which constitutes a substantially continuous and uninterrupted annular flow space therebetween past which lubricant can be forced as the nut traverses the shaft, thereby to minimize the drag of any piston effect which the nut might have on the lubricant.

2. The invention as defined in claim 1, wherein:
   (a) the housing has four side walls and four wall openings, one in each side wall respectively,
   (b) three screw plugs disposed respectively in three of said side wall openings, and
   (c) a screw fitting disposed in the fourth side wall opening, said screw fitting having a vent opening through it and being located in an uppermost one of the side walls, said vent opening enabling fluid to pass therethrough and equalize sudden changes in pressure between the housing interior and its exterior, as results from axial movement of the nut along the shaft.

3. The invention as set fourth in claim 1, wherein:
   (a) the nut has a pair of transverse slots through which lubricant from the interior of the housing can reach the threads of the shaft.

4. The invention as defined in claim 1, wherein:
   (a) one side wall of the housing has a venting aperture, and
   (b) a lubricant reservoir connected with said venting aperture and disposed generally higher than the level of the housing, such that lubricant can flow by gravity from the reservoir into the housing, and be forced back into the reservoir as the nut is moving axially along the shaft.

5. The invention as defined in claim 4, wherein:
   (a) said reservoir comprises a container having a vent,
   (b) said vent being located in an upper portion of the container so as to prevent loss of lubricant through the vent.

6. A traverse mechanism, comprising in combination:
   (a) a base having track means thereon,
   (b) a carriage movable with respect to the base, having track means engaged with said track means of the base,
   (c) a tubular housing carried by the base,
   (d) a screw shaft having an axis of rotation and having a drive portion projecting from one end of said housing,
   (e) said shaft having a threaded portion disposed substantially completely within the housing,
   (f) a nut disposed substantially completely within the housing and engaging the threaded portion of the screw shaft,
   (g) a thrust rod connected with the nut and extending from the other end of the housing, said rod being connected to said carriage to drive the same along said track means of the base,
   (h) said base having a surface comprising a pair of generally planar intersecting faces, disposed at an angle with respect to one another,
   (i) said housing having an exterior surface comprising a pair of generally planar intersecting faces, disposed at an angle same as that of said base faces with respect to one another and respectively disposed flat against the faces of the base surface,
   (j) said planar intersecting faces of the housing surface lying in planes which provide for accurate alignment of the axis of the screw shaft with respect to the path of the carriage along the track means of the base,
   (k) said carriage longitudinally surrounding a substantial portion of said housing.

7. The invention as set fourth in claim 6, wherein:
   (a) both said track means support the carriage and are spaced from the planar faces of the base and housing.

8. The invention as set fourth in claim 6, wherein:
   (a) said track means comprises means defining a pair of grooves in the base, means defining a second pair of grooves in the carriage, and rollers disposed between the pairs of grooves of the base and carriage.

9. The invention as set fourth in claim 6, wherein:
   (a) the housing bore is of substantially cylindrical configuration and has an axis substantially coincidental with that of the shaft.

10. The invention as set fourth in claim 6, wherein:
    (a) said planar faces of the base surface comprise a machined, straight-sided and straight-bottomed groove, in which the housing is secured in accurately aligned orientation with the track means of the carriage.

11. The invention as set fourth in claim 6, wherein:

- (a) both said track means support the carriage and are spaced from the planar faces of the base and housing surfaces,
- (b) said planar faces of the base surface comprising a machined, straight-sided and straight-bottomed groove, in which the said housing is secured in accurately aligned orientation with the track means of the carriage.

12. The invention as set fourth in claim 6, wherein:
- (a) the intersecting planar faces of the housing surface are disposed substantially perpendicular to one another, and
- (b) the intersecting planar faces of the base surface are also disposed substantially perpendicular to one another.

13. The invention as set forth in claim 6, wherein:
- (a) the housing has a parallelepiped exterior configuration,
- (b) the bore of the housing having an axis which is precisely parallel to the planar faces thereof, and which is substantially coincidental with the axis of the screw shaft.

14. The invention as set forth in claim 6, wherein:
- (a) the axis of the screw shaft is precisely parallel to the track means of the base, on which the carriage rides.

15. The invention as set forth in claim 6, and further wherein:
- (a) seals disposed at the opposite ends of the housing and engaging the drive portion of the shaft and the thrust rod, respectively,
- (b) a quantity of lubricant contained within the housing,
- (c) said seals enabling rotation of said shaft and axial movement of the thrust rod substantially without loss of lubricant past the seals,
- (d) said tubular housing being constituted of metal and comprising a chamber in which the shaft and nut are continuously bathed in lubricant,
- (e) said base surface being an expansive surface,
- (f) said housing exterior surface being a cooperable expansive surface disposed against said base surface so as to be in good heat-transferring relation therewith,
- (g) said lubricant absorbing heat generated between the shaft and nut and transferring the same to the housing, and said housing transferring the heat received by it to the base so as to be dissipated thereby, thus preventing excessive heat build-up at points of contact of the screw shaft and nut.

16. The invention as set forth in claim 15, wherein:
- (a) said nut comprises two nut halves, and
- (b) means biasing said halves toward one another and into forceful engagement with the threaded portion of the shaft, so as to reduce backlash,
- (c) said forceful engagement producing heat resulting from friction, and said heat being dispersed by the lubricant.

17. The invention as set fourth in claim 6, and further including:
- (a) a first universal joint joining the thrust rod to the nut, and
- (b) a second universal joint joining the opposite end of the thrust rod to the carriage, whereby there is reduced the tendency for binding between the nut and screw shaft to occur as a result of any misalignment therebetween.

18. The invention as set fourth in claim 17, wherein:
- (a) the first universal joint comprises means defining a pair of transverse slots in the nut, and a second pair of transverse slots in the thrust rod, one pair being phase-displaced 90° with respect to the other pair,
- (b) the pair of slots in the nut forming two narrow hinge portions therein.

19. The invention as set forth in claim 17, wherein:
- (a) the second universal joint comprises means defining two pairs of slots in the thrust rod, one pair being phase-displaced 90° with respect to the other pair.

* * * * *